(12) United States Patent
Johnson

(10) Patent No.: US 7,726,123 B2
(45) Date of Patent: Jun. 1, 2010

(54) WAVE ENERGY DEVICE

(75) Inventor: Fraser Jon Edmund Johnson, Plymouth (GB)

(73) Assignee: Orecon Ltd., Exeter (GB)

( * ) Notice: Subject to any disclaimer, the term of this patent is extended or adjusted under 35 U.S.C. 154(b) by 0 days.

(21) Appl. No.: 10/598,461

(22) PCT Filed: Mar. 8, 2005

(86) PCT No.: PCT/GB2005/000902

§ 371 (c)(1),
(2), (4) Date: Nov. 8, 2006

(87) PCT Pub. No.: WO2005/085631

PCT Pub. Date: Sep. 15, 2005

(65) Prior Publication Data

US 2007/0180823 A1    Aug. 9, 2007

(30) Foreign Application Priority Data

Mar. 8, 2004  (GB) ................................. 0405170.2

(51) Int. Cl.
*F16D 31/02* (2006.01)
(52) U.S. Cl. ......................... 60/398; 60/497; 60/498; 290/42; 290/53
(58) Field of Classification Search .................. 60/398, 60/495–498, 502; 290/42, 53
See application file for complete search history.

(56) References Cited

U.S. PATENT DOCUMENTS

| | | | | |
|---|---|---|---|---|
| 4,123,185 A | * | 10/1978 | Hagen et al. | ................... 405/76 |
| 4,198,821 A | | 4/1980 | Moody et al. | |
| 4,341,959 A | * | 7/1982 | Ambli | ........................... 290/53 |
| 4,363,213 A | * | 12/1982 | Paleologos | ................... 60/505 |
| 4,383,413 A | | 5/1983 | Wells | |
| 5,770,893 A | | 6/1998 | Youlton | |
| 6,857,266 B2 | * | 2/2005 | Dick | ........................... 60/496 |
| 2004/0163387 A1 | | 8/2004 | Pineda | |

FOREIGN PATENT DOCUMENTS

| | | |
|---|---|---|
| GB | 1601060 | 10/1981 |
| GB | 2161544 | 1/1986 |
| GB | 2325964 | 12/1998 |
| JP | 60090990 | 5/1985 |
| JP | 60215907 | 10/1985 |
| JP | 61190171 | 8/1986 |
| JP | 2002303242 | 10/2002 |

OTHER PUBLICATIONS

Kim T-H et al.: "Performance Comparison of Turbines for Wave Power Conversion", Revue Generale de Thermique, Elsevier Editions Scientifiques et Medicales, Paris, FR, vol. 40, No. 7, Jul. 2001, pp. 681-689, X)001053974, ISSN; 0035-3159, Abstract; Figs. 1, 4; Conclusions.

* cited by examiner

*Primary Examiner*—Hoang M Nguyen
(74) *Attorney, Agent, or Firm*—Saul Ewing LLP

(57) ABSTRACT

A wave energy device in the form of a self buoyant heave-resistant vessel (10) comprising two or more discrete flow paths into which water can be urged by wave action and a bi-directional energy extractor in fluid communication with said path(s) and atmosphere, arranged to extract energy from air movements in said path(s) caused by said wave action.

14 Claims, 4 Drawing Sheets

WAVE ENERGY DEVICE

FIELD OF THE INVENTION

The Invention relates to a wave energy device.

BACKGROUND OF THE INVENTION

Wave motion in bodies of water has long been recognised as a source of renewable energy. The invention aims to provide a device for exploiting this energy resource.

SUMMARY OF THE INVENTION

According to one aspect, the invention provides a wave energy device in the form of heave-resistant vessel comprising two or more flow paths into which water can be urged by wave action and an energy extractor in fluid communication with said path(s) and arranged to extract energy from air movements in said path(s) caused by said wave action.

According to another aspect of the invention, there is provided a wave energy device in the form of a heave-resistant vessel comprising one or more flow paths into which water can be urged by wave action and an energy extractor in fluid communication with said path(s) and arranged to extract energy from air movements in said path(s) caused by said wave action.

In a preferred embodiment, there is a plurality of flow paths, as least some of which have different lengths. In this way, flow paths can have different frequencies in order to allow the device to extract energy from waves of different periodicity in an efficient manner.

The or each flow path may be in communication with the atmosphere, at some point beyond the energy extractor.

In one embodiment, there is a plurality of flow paths comprised of a group of chambers. The chambers may be uniform or dissimilar. The chambers may be polygonal, rounded or indeed circular in cross-section.

In some embodiments, the wave energy entrance to at least one of the flow paths is shaped to enhance the energy extraction process. Preferably, this shaping is applied to the part of the flow path that is adjacent to the wave entrance of the flow path and takes the form of a smooth flaring of the flow path as it extends towards the wave entrance. Such shaping can reduce the turbulence created in water exchanged with the flow path under wave action.

In certain embodiments, two or more flow paths may combine before communicating with the energy extractor.

The heave-resistance of the vessel can be achieved in various ways. For example, the vessel may be tethered under tension to, say, the sea bed. If necessary or desired, the tethering system can have sufficient elasticity to allow the vessel to rise and fall with tidal activity. As one alternative to the use of tethers, or possibly in addition to the use of tethers if necessary, the heave-resistance of the vessels may be achieved or aided by the design of the vessel. This is to say, the footprint which the vessel presents to the water or, to state it another way, the cross-sectional area occupied by the vessel in plane of the water surface may be kept low in order to reduce an increase in buoyancy of the vessel due to water rising around the vessel from wave action. If necessary or desired, it is also possible to fit the vessel with a floatation aid.

Preferably, said heave resistance is provided by a positive buoyancy and tethering arrangement.

The energy extractor is preferably turbine-based for converting the energy in the air movements into electrical energy. However, the energy extractor may be arranged to perform other types of energy extraction. For example, the energy extractor may simply convert the air movements into mechanical energy for the use by some other system or the energy extractor could be arranged to convert the energy in the air movements into hydraulic energy.

Preferably, there is a plurality of flow paths, at least some of which have different flow cross-sectional areas.

Preferably, there is a plurality of flow paths, at least some of which have different internal flow volumes.

BRIEF DESCRIPTION OF THE DRAWINGS

By the way of example only, certain embodiments of the invention will now be described with reference to the accompanying figures in which.

DETAILED DESCRIPTION OF THE PREFERRED EMBODIMENTS

Figure 1:
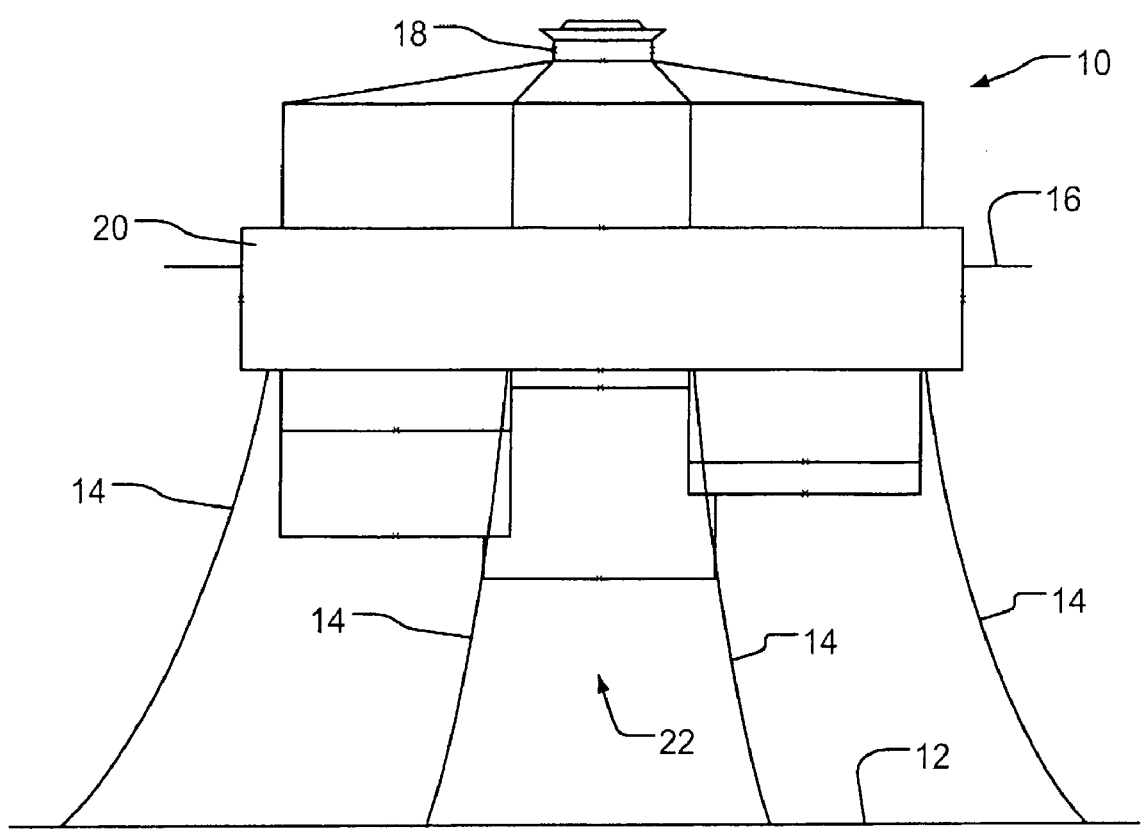
FIG. 1 is a side elevation of a wave energy device.

FIG. 1 illustrates a wave energy device 10 deployed in the sea and anchored to the sea bed 12 by tethers 14. The wave energy device 10 is arranged to float such that part of its structure protrudes from the surface of the water. In FIG. 1, the mean sea level is indicated 16. Wave crests will protrude above the mean sea level 16 and wave troughs will dip below this level.

The main structural element of the wave energy device 10 is a group of elongated chambers that extend in parallel to one another and whose walls are structurally linked or common and thus lend rigidity to the wave energy device 10. The chambers extend vertically from the vicinity of a turbine 18 located above the water surface to differing depths below the water surface. The upper ends of the chambers are ducted into the turbine 18 and the lower ends of the chambers extend, by differing amounts, from a buoyancy jacket 20 which shrouds the group of chambers. The lower ends of the chambers protruding from the buoyancy jacket 20 are generally indicated 22 in FIG. 1.

The lower ends of the chambers are open to the water. The upper ends of the chambers lead into the ducting which places the chambers in fluid communication with the turbine 18. The turbine 18 opens into the atmosphere and places the ducting, and hence the chambers, in fluid communication with the atmosphere.

Figure 2:
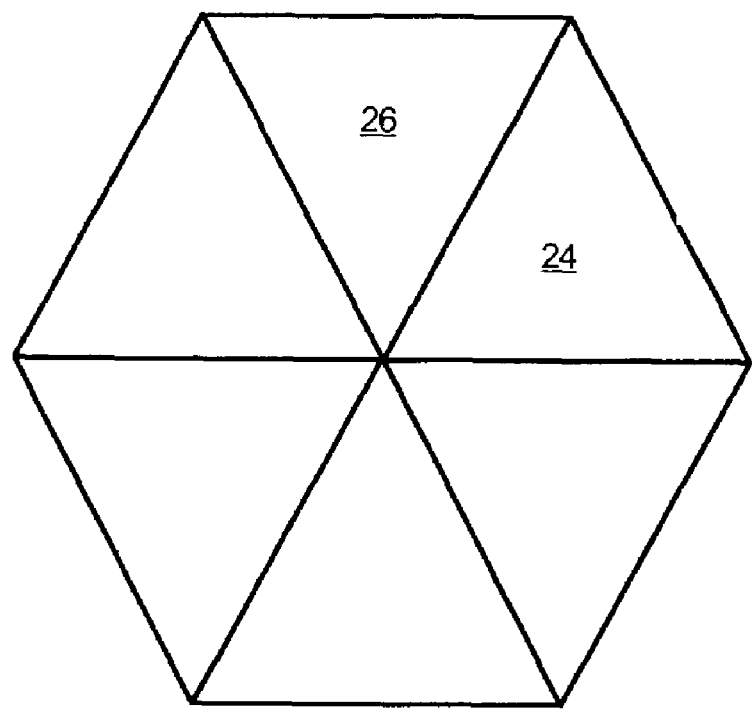
FIG. 2 is a simplified view of the device of FIG. 1 taken from the sea bed.

In the wave energy device 10 shown in FIG. 1, there are six chambers in the group. The chambers, when viewed from below towards their open ends, appear as equal segments of a hexagon, as shown in FIG. 2. The six chambers have different lengths. Chamber 24 is the shortest and each successive chamber in the clockwise direction is longer than the preceding one, the sequence terminating with chamber 26.

The wave energy device 10 is designed such that its overall density would cause it to float relative to the mean sea level 16 in the position shown in FIG. 1. Moreover, the wave energy device 10 is designed so that the effect of wave action upon its buoyancy is minimised. Essentially, the advent of a wave crest at the side of the wave energy device is a temporary increase in the water level in the vicinity of the device 10. This increase produces a temporary submersion of an additional part of the volume of the device 10, leading to an additional upward force on the device 10. The device 10 can be designed such that the amount of additional volume that is submerged by wave action is reduced to an extent sufficient to make the aforementioned additional upward force negligible relative to the weight of the device 10, therefore producing the result that the wave action has little effect on absolute vertical position of the wave energy device 10.

Figure 3:
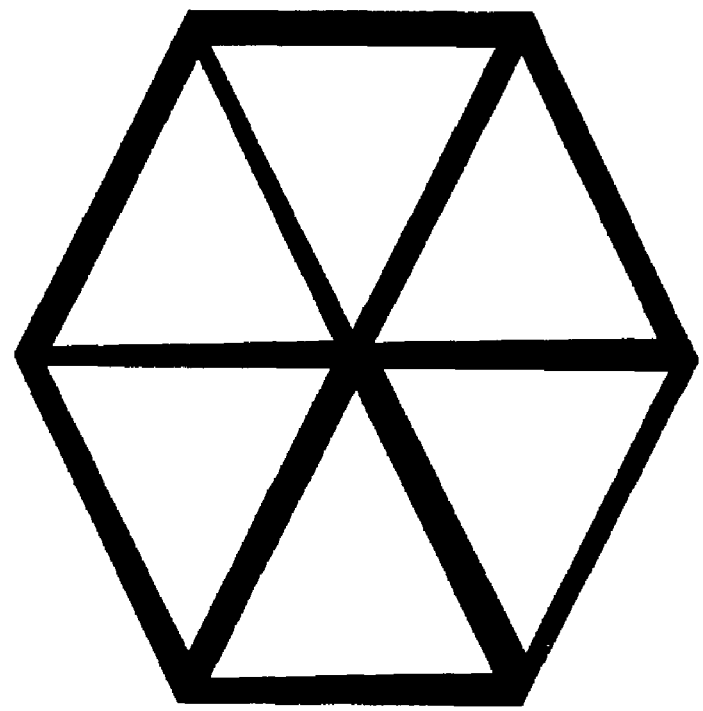
FIG. 3 illustrates the thickening of the chamber walls in the device of FIG. 1.

By way of illustration of this principle, reference can be made to FIG. 3 in which the walls of the cylindrical chambers have been thickened (without changing the chamber's external cross-sectional dimensions). In FIGS. 2 and 3, the shaded, i.e. solid, areas represent the cross-sectional area of the chamber walls in the plane of the mean water level 16. The thicker walls in the embodiment of FIG. 3 provide for increased buoyancy of the device 10. It will be apparent that a temporary increase in water level due to the presence of a wave crest at the device 10 would lead to a significantly larger increase in water displacement in the case of a device having a greater cross-sectional area in the plane of the mean water level leading to a greater upward force in that case, that is to say the upward force is dependent upon the overall flow cross-sectional area of the successive chambers at the plane of the mean water level.

Figure 4:
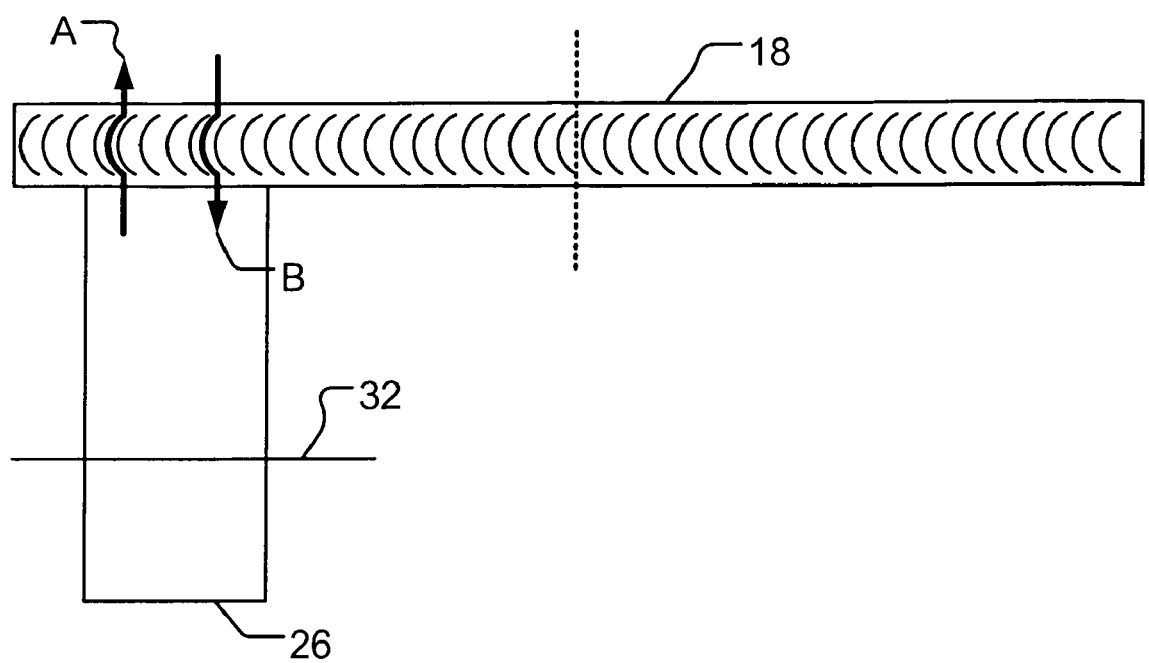
FIG. 4 is a schematic diagram illustrating the principle of operation of the device of FIG. 1.

In the embodiments of FIGS. 2 and 3 the cross-sectional areas of the successive chambers are substantially the same. However, in an alternative embodiment the flow cross-sectional area of the chambers may be different. For example, the flow cross-sectional of one or more of the chambers may be lesser or greater than the remainder. In different embodiments all the chambers may have different flow cross-sectional areas. As described above, the wave energy device 10 is designed to heave (i.e. move vertically) only minimally in response to wave action. Accordingly, as a wave passes through the device 10, the water level will rise and fall in the chambers. As the water level rises in any given chamber, air will be pushed out of the chamber, through the ducting and through the turbine into the atmosphere. When the water level falls in any given chamber, air will be drawn down into the chamber from the external atmosphere via the turbine 18 and the ducting. Therefore, the passage of waves through the device 10 leads to an exchange of air through the turbine 18. FIG. 4 provides a schematic illustration of this process.

In FIG. 4, only those elements of the wave energy device 10 that are necessary for understanding the passage of the air flow through the turbine are shown. For example, in FIG. 4, only one chamber, 26, is shown and the ducting between the chamber and the turbine 18 is omitted for the sake of clarity. The turbine includes a fan with a large number of vanes. In FIG. 4, the axis of rotation of this fan is indicated by the dashed line and the tips of the vane on the half of the fan's circumference that faces towards the reader are indicated by the row of curved lines, of which 30 is an example.

As a wave crest approaches the device 10, the water level 32 within chamber 26 rises causing air to be expelled from the chamber 26 through the turbine 18 in the direction indicated by the arrow A. This causes the fan to rotate in the sense in which the vane tips shown in FIG. 4, such as 30, move from right to left. When the crest of the wave has passed by, the water level 32 within the chamber 26 drops, reducing the air pressure in the space above the water in chamber 26, causing air to be drawn into chamber 26 through the turbine in the direction indicated by arrow B. Although this air flow is in the opposite direction to before, the fan will rotate in the same sense as before because of special shaping applied to its vanes. The chambers vent independently into the turbine 18.

Thus, it is possible that one chamber could be driving the turbine 18 by drawing air down into the device whilst, at the same time, another chamber is expelling air through the turbine. However, it is possible that some chambers join or merge so that they act on the turbine in unison. The fan of the turbine 18 is mechanically coupled to a generator so that the rotational energy of the fan can be converted into electricity.

It will be apparent that the chamber 26 will resonate with a water wave of particular wavelength of period. The precise wavelength that will resonate with the chamber 26 depends upon the length of the chamber, When the chamber 26 is in resonance, the energy extractor from the chamber 26 by the turbine 18 will be at a maximum. However, water waves will, in practice, contain a spectrum of continuously varying wavelengths. To cater for this, the chambers of the wave energy device 10 each have a different length as described earlier. The provision of various chamber lengths increase the probability that at least some part of the wave energy device 10 will be operating under resonant conditions at any given time.

Figure 5:
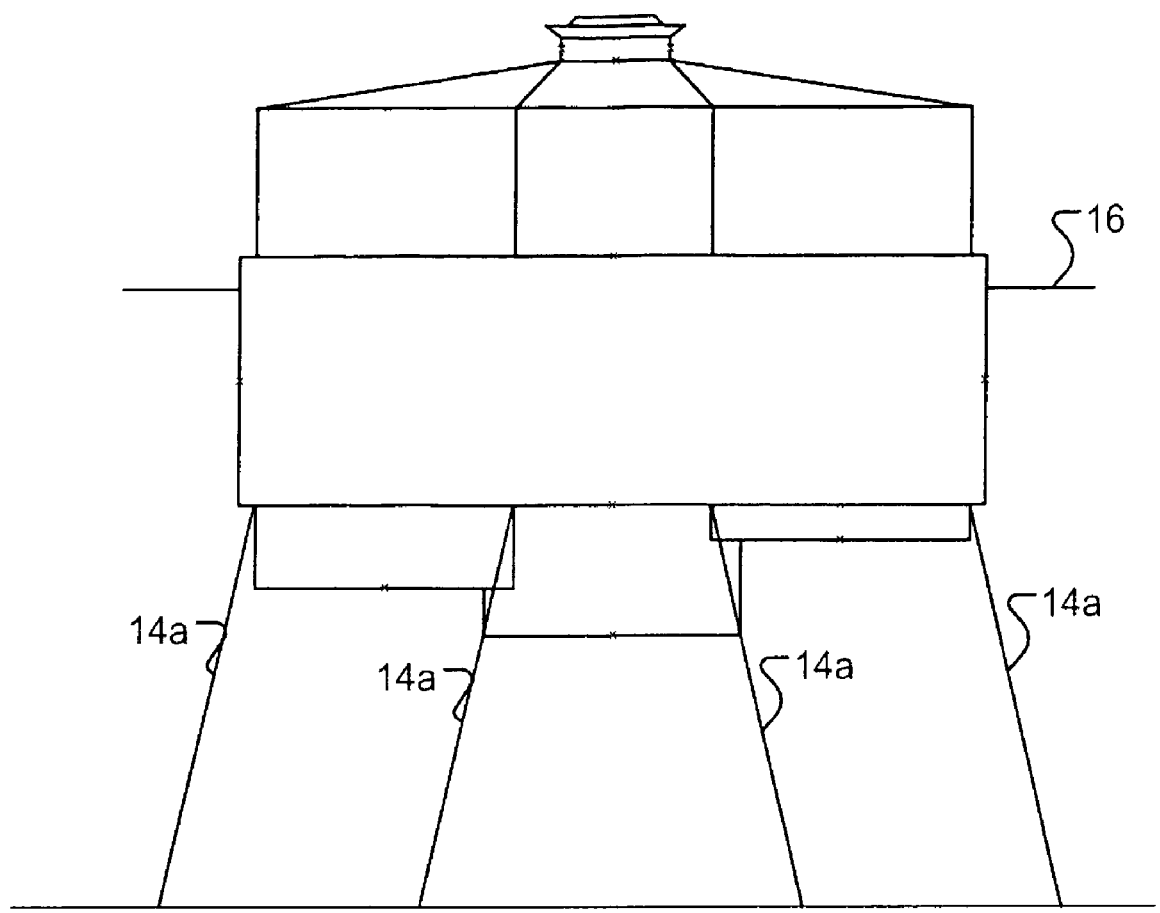
FIG. 5 illustrates an alternative deployment of the device shown in FIG. 1.

FIG. 5 shows an alternative way of deploying the wave energy device 10. In FIG. 5, the wave energy device 10 is provided with positive buoyancy and it is restrained by taut tethers 14a which hold the device 10 in the position relative to the mean water level 16 that is shown in FIG. 5. The tethers 14a prevent heave motion of the wave energy device 10 and wave action causes the water level to rise and fall in the chambers 26 as in the deployment shown in FIG. 1. The tethers 14a are, to a certain extent, elastic so as to accommodate any rise and fall of the mean water level 16 due to, for example, tidal action.

The invention claimed is:

1. A tension-moored wave energy device, in which the device includes:
   (a) multiple chambers, the lower end of each chamber being open to water above the wave base when operating in resonance to generate energy, the wave base being the maximum depth at which a wave's passage causes significant water motion, and the upper end of each chamber being connected via ducting to an air turbine;
   (b) each chamber defining an air flow path;
      in which at least some chambers differ from others by being designed to resonate at different incident wave frequencies, irrespective of the orientation of the device in relation to incident waves;
   and in which the device floats but is tension-moored to resist heaving in response to wave action such that when the device is operating in resonance a passing wave has no substantial effect on the absolute vertical position of the device, and causes the level of water in each chamber to rise relative to the device.

2. The wave energy device of claim 1 in which the tension-mooring restrains the device relative to the mean water level to prevent heave.

3. The wave energy device of claim 1 in which the device is adapted to be heave resistant by having a cross-sectional area that is selected to be sufficiently small such that any increase in buoyancy of the device associated with a wave passing the device is negligible compared to the weight of the device.

4. The wave energy device of claim 1 in which the air turbine is bi-directional.

5. The wave energy device of claim 1 in which some chambers differ from others by extending below the mean water level to different depths.

6. The wave energy device of claim 1 in which some chambers differ from others by having different cross-sectional areas.

7. The wave energy device of claim 1 in which the resonant characteristics of each chambers is selected to increase the probability that at least one chamber is in resonance at any given time.

8. The wave energy device of claim 1 in which two or more chambers vent air together to the turbine.

9. The wave energy device of claim 1 in which two or more chambers vent air independently to the turbine, so that one chamber is expelling air through the turbine whilst another is sucking air through the turbine.

10. The wave energy device of claim 1 in which each chamber is cylindrical.

11. The wave energy device of claim 1 in which the chambers are arranged in a rotationally symmetric manner in plan view.

12. The wave energy device of claim 1 in which the lower end of a chamber is flared to reduce water turbulence.

13. The wave energy device of claim 2 in which the tension-mooring is sufficiently elastic to accommodate any rise and fall of the mean water level around the device.

14. The wave energy device of claim 1 in which the tension-mooring is sufficiently elastic to accommodate the rise and fall of the mean water level around the device due to tidal action.

* * * * *